(12) United States Patent
Wu et al.

(10) Patent No.: US 8,281,658 B2
(45) Date of Patent: Oct. 9, 2012

(54) METHOD TO PRODUCE 3-D OPTICAL GYROSCOPE MY MEMS TECHNOLOGY

(75) Inventors: Ting-Hau Wu, Yilan (TW); Chun-Ren Cheng, Hsin-Chu (TW); Jiou-Kang Lee, Zhu-Bei (TW); Jung-Huei Peng, Jhubei (TW); Shang-Ying Tsai, Jhongli (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 718 days.

(21) Appl. No.: 12/352,449

(22) Filed: Jan. 12, 2009

(65) Prior Publication Data

US 2010/0175479 A1    Jul. 15, 2010

(51) Int. Cl.
    *G01C 19/00* (2006.01)
(52) U.S. Cl. .................. 73/504.08; 73/504.11
(58) Field of Classification Search ............. 73/504.11, 73/504.13, 504.02, 504.04, 504.12, 504.08, 73/504.09
See application file for complete search history.

(56) References Cited

U.S. PATENT DOCUMENTS

| | | | |
|---|---|---|---|
| 3,998,105 A * | 12/1976 | Flusche | 73/504.11 |
| 4,361,760 A * | 11/1982 | Rodgers | 250/231.12 |
| 4,791,727 A | 12/1988 | Hojo et al. | |
| 4,848,169 A * | 7/1989 | Duncan et al. | 74/5 F |
| 4,930,365 A * | 6/1990 | Porat et al. | 74/5.6 A |
| 5,085,501 A * | 2/1992 | Sakuma et al. | 356/459 |
| 5,385,047 A * | 1/1995 | Cochard et al. | 73/504.02 |
| 5,698,783 A * | 12/1997 | Murakoshi et al. | 73/504.03 |
| 5,818,590 A * | 10/1998 | Patterson | 356/465 |
| 6,615,681 B1 * | 9/2003 | Jenkins et al. | 74/5.46 |
| 7,346,178 B2 | 3/2008 | Zhe et al. | |

FOREIGN PATENT DOCUMENTS

| | | | |
|---|---|---|---|
| JP | 61-200425 | * | 9/1986 |
| TW | I293423 | | 2/2008 |
| WO | 90/10843 | | 9/1990 |

OTHER PUBLICATIONS

Johari et al.; "High-Frequency Capacitive Disk Gyroscopes in (100) and (111) Silicon"; School of Electrical and Computer Engineering; Georgia Institute of Technology; 4 pages.
Office Action dated Mar. 16, 2012 from corresponding application No. CN 200910171636.1.
Office Action dated Mar. 7, 2012 from corresponding application No. TW098127614.

* cited by examiner

*Primary Examiner* — Helen C. Kwok
(74) *Attorney, Agent, or Firm* — Lowe Hauptman Ham & Berner, LLP

(57) ABSTRACT

A gyroscope sensor includes a gyro disk. A first light source is configured to provide a first light beam adjacent to a first edge of the gyro disk. A first light receiver is configured to receive the first light beam for sensing a vibration at a first direction of the gyro disk.

17 Claims, 13 Drawing Sheets

METHOD TO PRODUCE 3-D OPTICAL GYROSCOPE MY MEMS TECHNOLOGY

FIELD OF THE INVENTION

The present disclosure relates generally to the field of micro-electrical mechanical system (MEMS), and more particularly, to systems, gyroscope sensors of the systems, and fabrication methods for forming structures for the gyroscope sensors.

BACKGROUND OF THE INVENTION

A conventional micro-electrical mechanical system (MEMS) gyroscope is consisted of two masses that are movable with respect to a stator and coupled to one another so as to have a relative degree of freedom. The two movable masses are both capacitively coupled to the stator. One of the masses is dedicated to driving and is kept in oscillation at a resonance frequency. The other mass is drawn along in an oscillating motion and, in the case of rotation of the microstructure with respect to a pre-determined gyroscopic axis with an angular velocity, is subjected to a Coriolis force proportional to the angular velocity itself. In practice, the driven mass operates as an accelerometer that enables detection of the Coriolis force and acceleration and hence makes it possible to trace back to the angular velocity.

SUMMARY OF THE INVENTION

In one embodiment, a gyroscope sensor is provided. The gyroscope sensor includes a gyro disk. A first light source is configured to provide a first light beam adjacent to a first edge of the gyro disk. A first light receiver is configured to receive the first light beam for sensing a vibration at a first direction of the gyro disk.

In another embodiment, a system includes a gyroscope sensor coupled with a processing unit. The gyroscope sensor includes a gyro disk. A first light source is configured to provide a first light beam adjacent to a first edge of the gyro disk. A first light receiver is configured to receive the first light beam for sensing a vibration at a first direction of the gyro disk. The processing unit is capable of controlling the system corresponding to the vibration at the first direction of the gyro disk.

In the other embodiment, a method for forming a structure for a gyroscope sensor is provided. The method includes forming a gyro disk spaced from a frame by at least one first light channel, wherein the first light channel is capable of providing a path for a first light beam that is capable of being sensed for determining a vibration at a first direction of the gyro disk.

These and other embodiments of the present invention, as well as its features are described in more detail in conjunction with the text below and attached figures.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION OF THE INVENTION

Figure 1A:
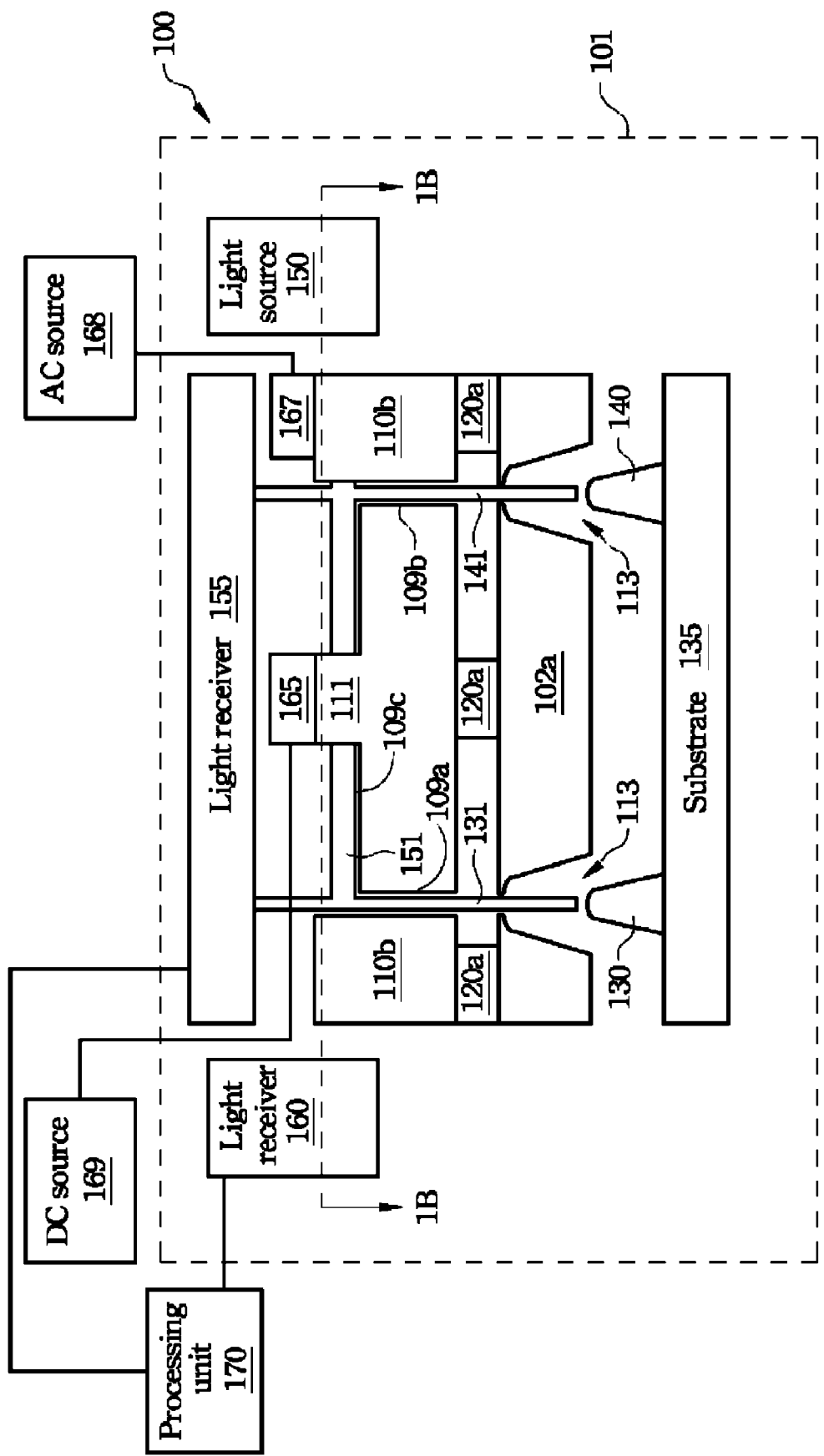
FIG. 1A is a schematic drawing showing a system including an exemplary gyroscope sensor.

The conventional capacitive gyroscope described above has at least three subpixels for detecting the Coriolis force on each of three gyroscopic axes such as X, Y, and Z-axes. The three-subpixels gyroscope requires a diode area. Furthermore, structures for sensing Coriolis forces on different gyroscopic axes such as X and Z-axes are different due to the different configuration of capacitors of the capacitive gyroscope. Accordingly, a few number of mask layers are used to form the conventional gyroscope.

From the foregoing, gyroscope sensors, systems including the gyroscope sensors, operating methods, and fabricating methods thereof are desired.

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contacted. In addition, the present disclosure may repeat reference numerals and/or letters in the various examples. This repetition is for the purpose of simplicity and clarity and does not in itself dictate a relationship between the various embodiments and/or configurations discussed.

Embodiments of the invention relate to gyroscope sensors, systems, and fabrication methods for forming structures for the gyroscope sensors by sensing an optical signal corresponding to a wave phase change of a light beam resulting from a Coriolis force. The gyroscope sensor can include a first light source configured to provide a first light beam adjacent to a first edge of the gyro disk. A first light receiver can be configured to receive the first light beam for sensing a vibration at a first direction of the gyro disk. Following are descriptions of various exemplary embodiments of the present invention. The scope of the invention is not limited thereto.

Figure 1B:
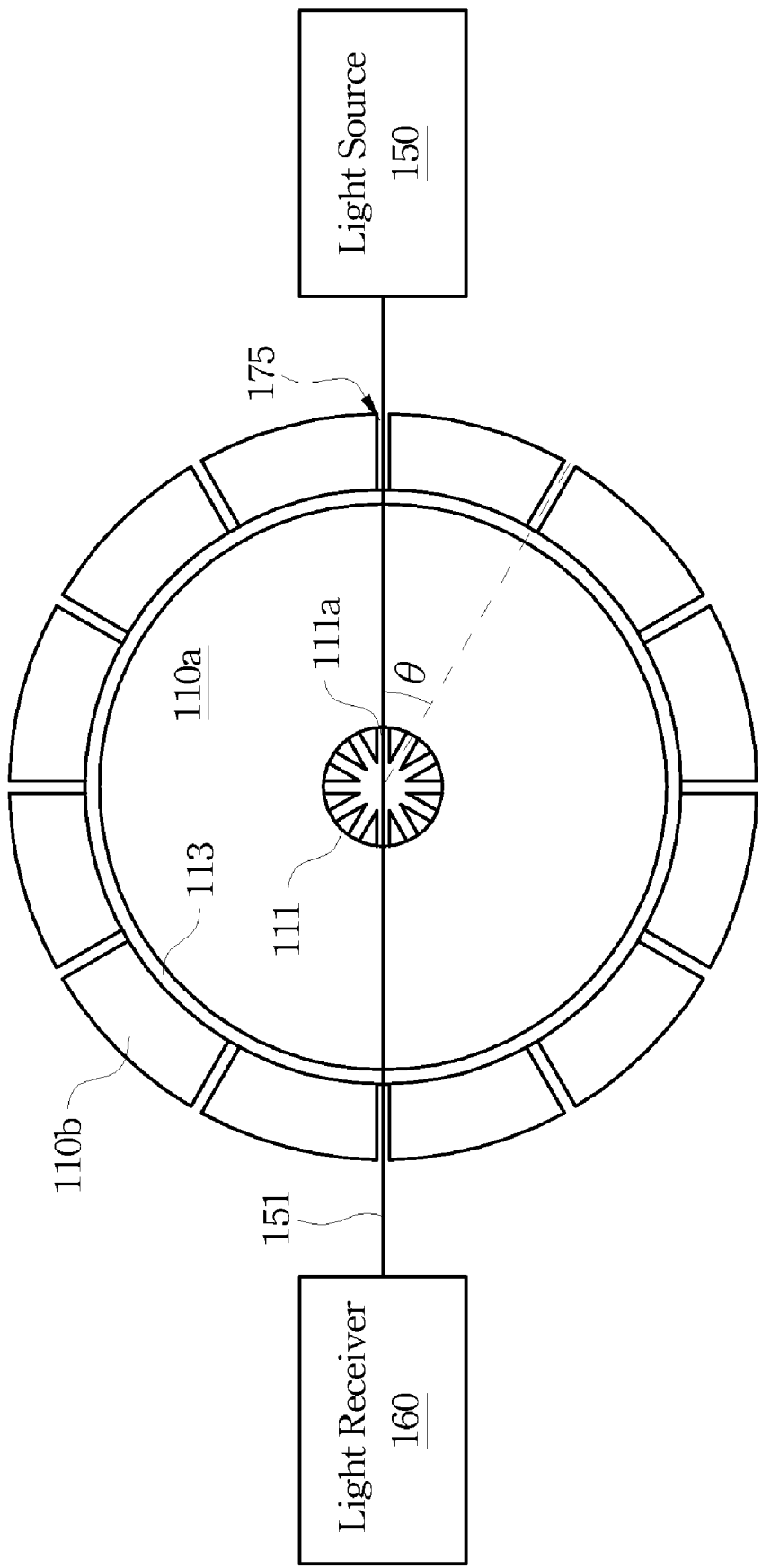
FIG. 1B is a schematic drawing illustrating a view taken along line 1B-1B of FIG. 1A.

FIG. 1A is a schematic drawing showing a system including an exemplary gyroscope sensor. FIG. 1B is a schematic drawing illustrating a view taken along line 1B-1B of FIG. 1A. In FIG. 1A, a system 100 can include a gyroscope sensor 101 and a processing unit 170. The system 100 can be vehicle aviation systems, digital cameras, global positioning systems, wireless communication devices, computer-related peripherals, entertainment devices, or systems that include a gyroscope sensor. The gyroscope sensor 101 can be an optical gyroscope sensor. The processing unit 170 can be coupled with the gyroscope sensor 101 for processing vibrations sensed by the gyroscope sensor 101. The processing unit 170 can include a central processing unit (CPU), signal-processing unit, optical signal processing unit, other processing unit, and/or combinations thereof.

In embodiments, the gyroscope sensor 101 can include a gyro disk 110a, at least one light source such as light sources 130, 140, and 150, and at least one light receiver such as light receivers 155 and 160. The light source 130 can be configured to provide a light beam 131 adjacent to a first edge 109a of the gyro disk 110a. The light receiver 155 can be configured to receive the light beam 131 for sensing a vibration at a first direction such as a pre-determined gyroscopic X-axis of the gyro disk 110a. The light source 140 can be configured to provide a light beam 141 adjacent to a second edge 109b of the gyro disk 110a, wherein the light beam 141 can be substantially parallel with the light beam 131. The light receiver 155 can be configured to receive the light beam 141 for sensing a vibration at a second direction such as a pre-determined gyroscopic Y-axis of the gyro disk 110a. In embodiments, the light sources 130 and 140 can be disposed over a substrate 135. In other embodiments, the light sources 130 and 140 can be disposed on different substrates. The light source 150 can be configured to provide a light beam 151 adjacent to a surface 109c of the gyro disk 110a, wherein the light beam 151 is substantially perpendicular to the light beam 131. The light receiver 160 can be configured to receive the light beam 151 for sensing a vibration at a third direction such as a pre-determined gyroscopic Z-axis of the gyro disk 110a. It is noted that the configuration and numbers of the light sources and light receivers described above are merely exemplary. The scope of the invention is not limited thereto.

In embodiments, the gyro disk 110a can include at least one material such as silicon, germanium, other material that can have an etch selectivity different from that of the dielectric 120a, and/or any combinations thereof. In embodiments, the gyro disk 110a can have a top view shape such as round, oval, square, rectangular, or other suitable shape. The gyro disk 110a can include a portion 111 coupled with an electrode 165. The portion 111 can include at least one channel such as channels 111a as shown in FIG. 1B. The channels 111a can provide paths through which the light beam 151 can pass. In embodiments, an angle θ between two neighboring channels 111a can be of about 30°, 45°, or other suitable degrees. One of skill in the art can modify the numbers and angle of the channels 110a and the scope of the invention is not limited to the drawing shown in FIG. 1B.

The light sources 130, 140, and/or 150 can be a laser diode, light emitting diode, infrared ray (IR) emitter, X-ray emitter, other light source, and/or combinations thereof. The light receivers 155 and/or 160 can include a sensor, optical sensor, complementary metal-oxide-semiconductor sensor, other sensor that is capable of receiving the light beam based on the wavelength of the light beam.

Referring to FIG. 1A, the gyroscope sensor 101 can include a substrate 102a. The substrate 102a can include at least one channel 113 for the light beams 131 and 141. In embodiments, the substrate 101 can comprise an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In one embodiment, the alloy semiconductor substrate may have a gradient SiGe feature in which the Si and Ge composition change from one ratio at one location to another ratio at another location of the gradient SiGe feature. In another embodiment, the alloy SiGe is formed over a silicon substrate. In another embodiment, a SiGe substrate is strained.

Referring to FIG. 1A, at least one dielectric 120a can be disposed over the substrate 102a. The dielectric 120a can support and separate the gyro disk 110a and a frame 110b from the substrate 102a. In embodiments, the dielectric 120a can include a material such as oxide, nitride, oxynitride, other dielectric that has an etch selectivity different from that of the substrate 102a, and/or combinations thereof.

The gyroscope sensor 101 can include the frame 110b that can be disposed around the gyro disk 110a. The frame 110b can be separated from the substrate 102a by the dielectric 120a. The frame 110b can include at least one channel such as channels 175 as shown in FIG. 1B. The channels 175 can provide paths through which the light beam 151 can pass. In embodiments, the channels 175 can correspond to the channels 111a such that the light beam 151 can pass through the frame 110b and the portion 111 of the gyro disk 110a. In embodiments, the frame 110b can include at least one material such as silicon, germanium, other material that has an etch selectivity different from that of the dielectric 120a, and/or any combinations thereof. In other embodiments, the frame 110b and the gyro disk 110a have the same material. One of skill in the art can modify the numbers of the channels 175 and the scope of the invention is not limited to the drawing shown in FIG. 1B.

In FIG. 1A, at least one channel 113 can be between the gyro disk 110a and the frame 110b for passes of the light beams 131 and 141. For example, the channel 113 can have a width that is equal to about the wavelength of the light beam 131 or more. In embodiments, the channel 113 can continuously extend around the gyro disk 110a (shown in FIG. 1B). In other embodiments, the channel 113 can include a plurality of holes through which the light beams 131 and 141 can pass.

Referring to FIG. 1A, electrodes 165 and 167 can be disposed over the gyro disk 110a and the frame 110b, respectively. The electrode 165 can be coupled with a direct current (DC) source 169 for operation. The electrode 167 can be coupled with an alternating current (AC) source 168 for operations. The AC source 168 and the DC source 169 are operated to provide an oscillating vibration having a frequency between about 3 kHz and about 30 kHz. The electrodes 165 and/or 167 can include at least one material such as polysilicon, metallic material, other conductive material, and/or combinations thereof. In embodiments, the electrodes 165 and 167 can be coupled with a stator for providing the oscillating vibration.

In embodiments, the gyroscope sensor 101 can be assembled such that the light beams 131, 141, and 151 pass the channels 113, 111a, and 175 filled with air. In other embodiments, the gyroscope sensor 101 can be assembled and filled with an inert gas (e.g., nitrogen, noble gas, and/or combinations thereof) within the channels 113, 111a, and 175. In still other embodiments, the pressure within the gyroscope sensor 101 can be around several torrs, such as about 1 torr. One of skill in the art is able to select the inert gas and/or modify the pressure to achieve a desired gyroscope sensor.

Figure 2A:
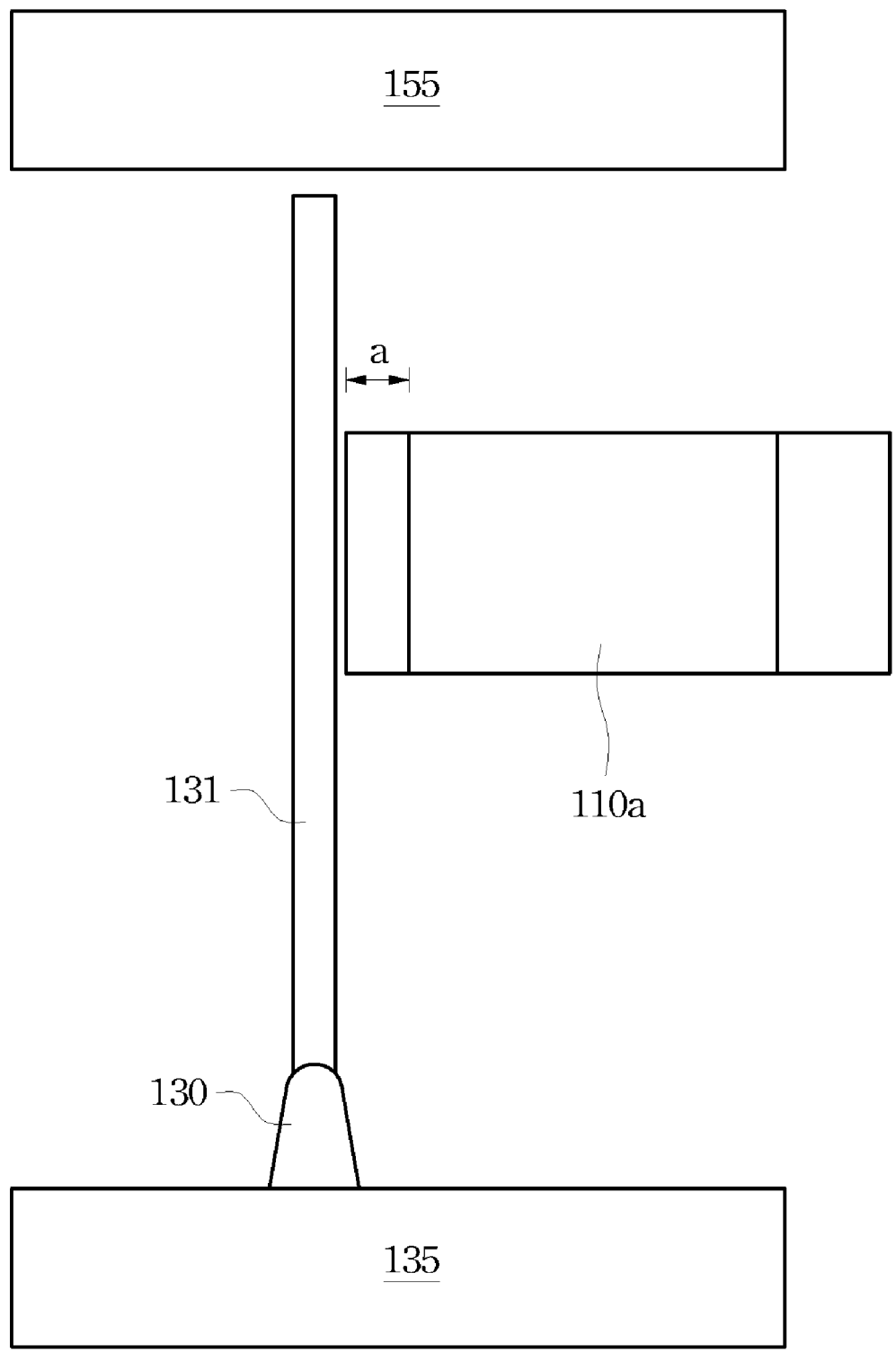
FIG. 2A is a schematic drawing showing that a small Coriolis force is applied to a gyro disk.
Figure 2B:
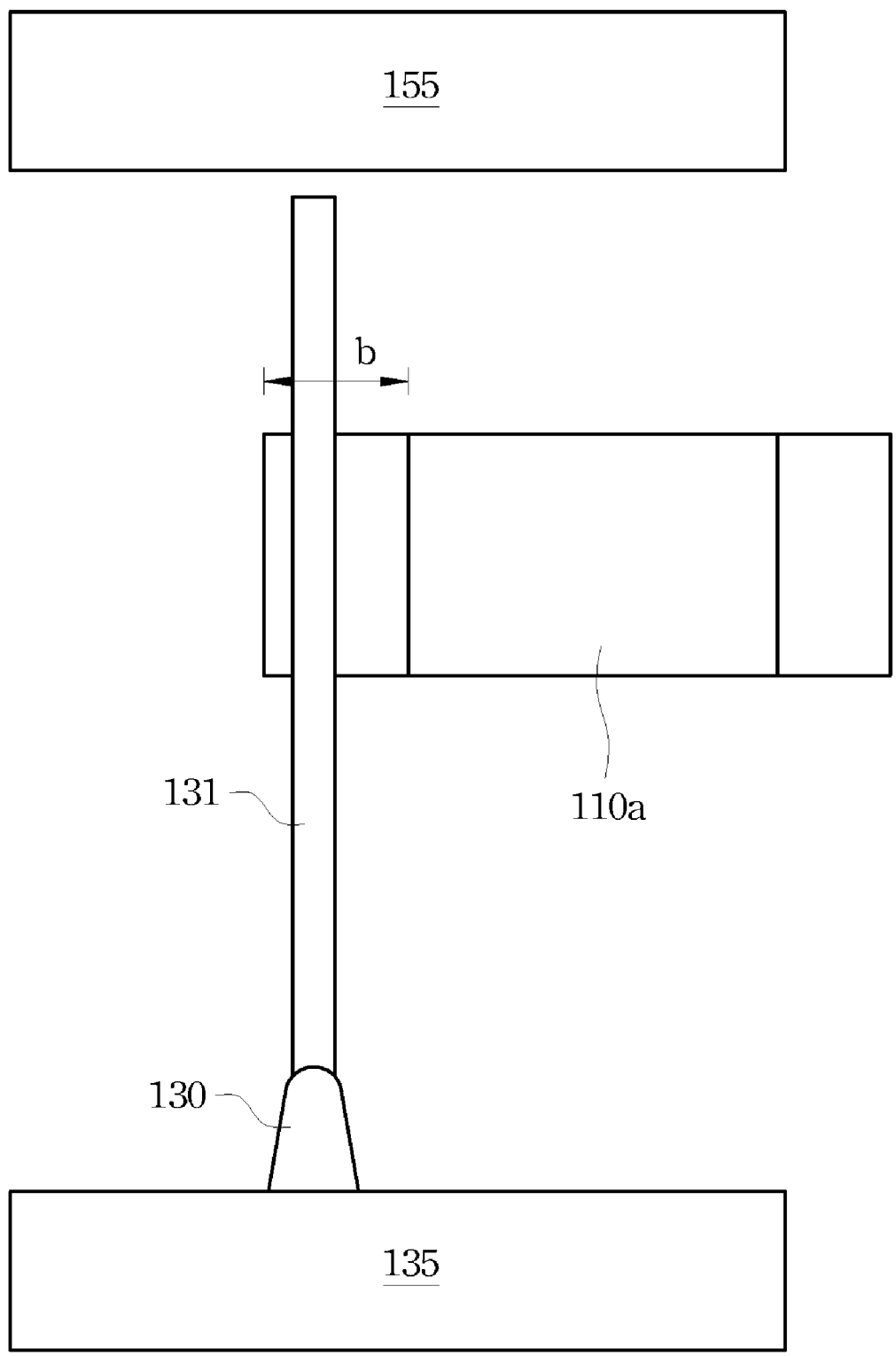
FIG. 2B is a schematic drawing illustrating that a Coriolis force is applied to a gyro disk blocking a light path.
Figure 2C:
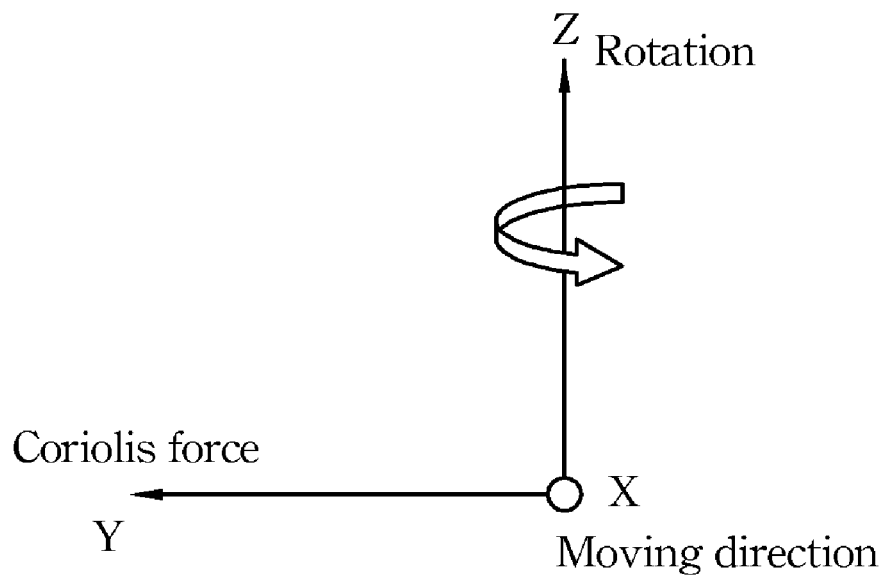
FIG. 2C is an exemplary 3-dimensional (3-D) gyroscopic coordinator coordination system.

Following are descriptions of exemplary operating methods for a system including a gyroscope sensor. FIG. 2A is a schematic drawing showing that a small Coriolis force is applied to a gyro disk. FIG. 2B is a schematic drawing illustrating that a Coriolis force is applied to a gyro disk blocking a light path. FIG. 2C is an exemplary 3-dimensional (3-D) gyroscopic coordination system. In FIG. 2C, it is assumed that the gyroscopic X-axis directly toward the viewer represents a moving direction of the gyro disk during a normal oscillating vibration, that the gyroscopic Z-axis represents an axis perpendicular to the gyro disk, and that the gyroscopic Y-axis represents an direction at which a Coriolis force is applied to the gyro disk when the gyroscopic Z-axis is subjected to a counter-clockwise rotation. Items of FIGS. 2A-2B that are the same items in FIG. 1A are indicated by the same reference numerals.

In FIG. 2A, the light source 130 can provide the light beam 131, which is received by the light receiver 155. During a normal oscillating vibration, the gyro disk 110a can move along the gyroscopic X-axis. If the gyroscopic Z-axis is subjected to rotation or a small counter-clockwise rotation, no Coriolis force or a small Coriolis force is generated at the gyroscopic Y-axis. For example, the counter-clockwise rotation applied to the gyroscopic Z-axis is so small such that a small Coriolis force generated at the gyroscopic Y-axis is applied to the gyro disk 110a, moving the gyro disk 110a by a distance "a" along the gyroscopic Y-axis. Since the distance "a" is small such that the gyro disk 110a is substantially free from blocking the path of the light beam 131, the light receiver 155 can still receive the light beam 131 and/or does not sense a substantial change of the phase of the light beam 131. Since the phase of the light beam 131 is not substantially changed, the processing unit 170 (shown in FIG. 1A) can be free from processing received light signals and free from informing that the system 100 is subjected to the counter-clockwise rotation at the gyroscopic Z-axis.

In embodiments, the system 100 such as a digital camera has the gyro disk 110a having a normal oscillating vibration at the gyroscopic X-axis. If the digital camera is subjected to an external force such as a handshaking, the gyroscopic Z-axis of the gyro disk 110a may be subjected to a counter-clockwise rotation as shown in FIG. 2C. Due to the counter-clockwise rotation at the gyroscopic Z-axis, a Coriolis force is generated and applied to the gyro disk 110a at the gyroscopic Y-axis, moving the gyro disk 110a with a distance "b" along the gyroscopic Y-axis (shown in FIG. 2B). The moving distance "b" can cause the gyro disk 110a to block and/or change the phase of the light beam 131 received by the light receiver 155. After receiving signals of the wave phase change of the light beam 131, the processing unit 170 (shown in FIG. 1A) can process the signal, informing that the digital camera is subjected to the external force and/or controlling the digital camera to compensate the Coriolis force.

Figure 2D:
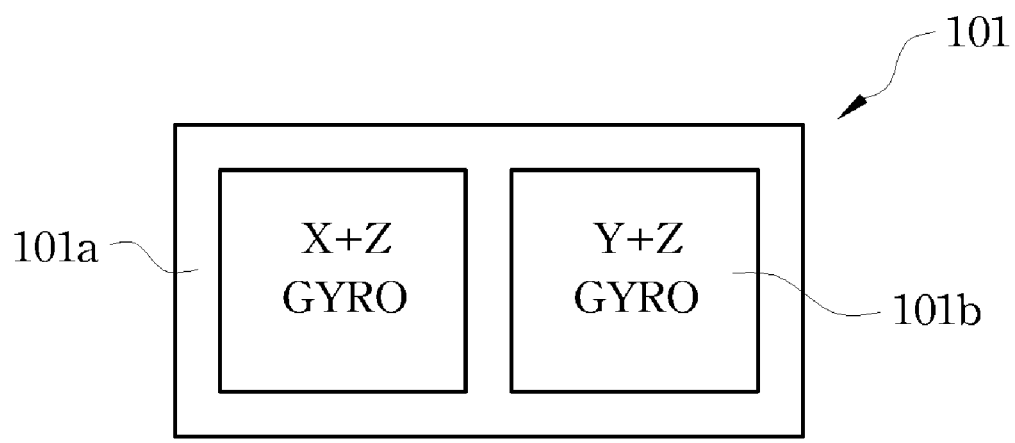
FIG. 2D is a schematic drawing illustrating an exemplary gyroscope sensor including two subpixels.

It is noted that the light source 130 and the light receiver 155 can monitor whether the gyro disk 110a is subjected to any Coriolis force during a regular oscillating vibration at the gyroscopic X-axis, the light source 140 and the light receiver 155 can monitor whether the gyro disk 110a is subjected to any Coriolis force during a regular oscillating vibration at the gyroscopic Y-axis, and the light source 150 and the light receiver 160 can monitor whether the gyro disk 110a is subjected to any Coriolis force during a regular oscillating vibration at the gyroscopic Z-axis. In embodiments, the light sources 130, 150 and the light receivers 155, 160 can cooperate to monitor any Coriolis force for the gyroscopic X-axis and gyroscopic Z-axis resonances in a subpixel 101a (shown in FIG. 2D). The light sources 140, 150 and the light receivers 155, 160 can cooperate to monitor any Coriolis force for the gyroscopic Y-axis and gyroscopic Z-axis resonances in a subpixel 101b (shown in FIG. 2D). The gyroscope sensor 101 can merely include two subpixels 101a and 101b for sensing any Coriolis force at three pre-determined gyroscopic axes. Compared to a conventional capacitor-type gyroscope having at least three subpixels for each of the gyroscopic X-axis, gyroscopic Y-axis, and gyroscopic Z-axis resonances, the area of the gyroscope sensor 101 can be desirably reduced.

Figure 3A:
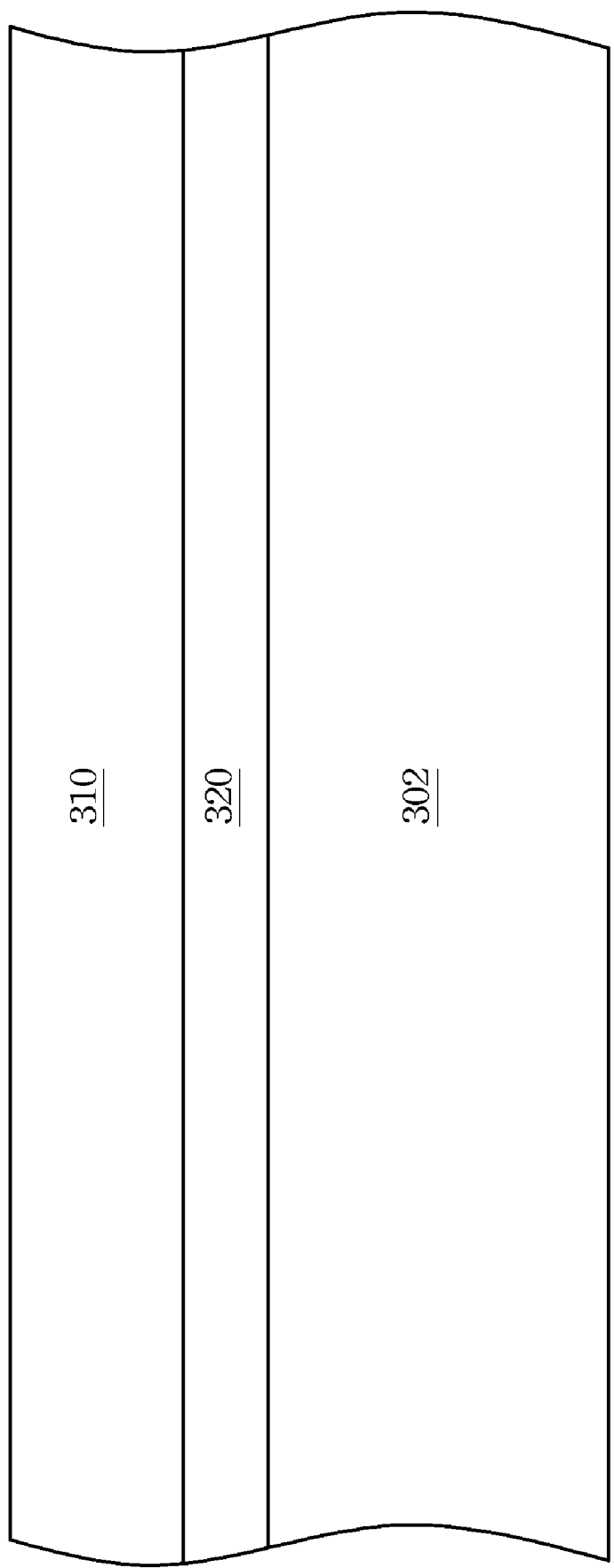
FIGS. 3A-3H are schematic cross-sectional views showing an exemplary process for forming a gyro disk and a frame of a gyroscope sensor.

FIGS. 3A-3H are schematic cross-sectional views showing an exemplary process for forming a gyro disk and a frame of a gyroscope sensor. In FIG. 3A, a dielectric 320 and a material layer 310 such as a silicon layer can be formed over a substrate 302. The dielectric 320 and the material layer 310 can have a material as same as the dielectric 120a and the gyro disk 110a, respectively, described above in conjunction with FIG. 1A. The material layer 310 and the dielectric 320 can be formed by, for example, chemical vapor deposition (CVD) processes. In embodiments, the structure shown in FIG. 3A can be a silicon-on-insulator (SOI) structure. The dielectric 320 can have a thickness between about 1.5 µm and about 2 µm. The material layer can have a thickness between about 20 µm and about 40 µm, such as about 30 µm.

Figure 3B:
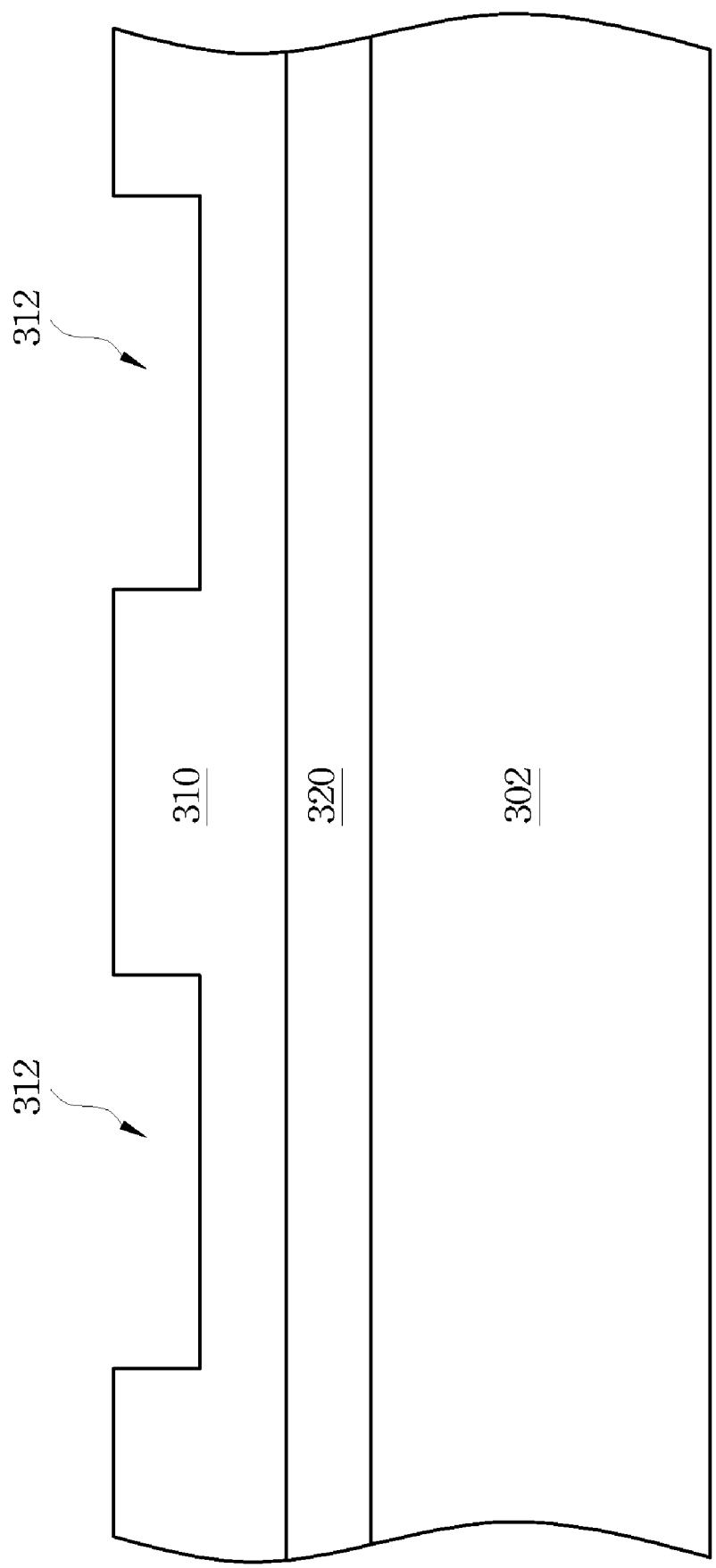

Referring to FIG. 3B, a portion of the material layer 310 can be removed to define a recess 312 including a plurality of channels (not shown). The channels can be the same as the channels 111a and 175 described above in conjunction with FIG. 1B. The recess 312 can have a depth of about 5 µm or less. In embodiments, the formation of the recess 312 may include patterning the material layer 310 by a photolithographic process, etching the material layer 310 (for example, by using a dry etching, wet etching, and/or plasma etching process), and then removing photoresist. In other embodiments, the photolithographic process, etching process, and the removing process can be repeated or saved to obtain a desired structure.

Figure 3C:
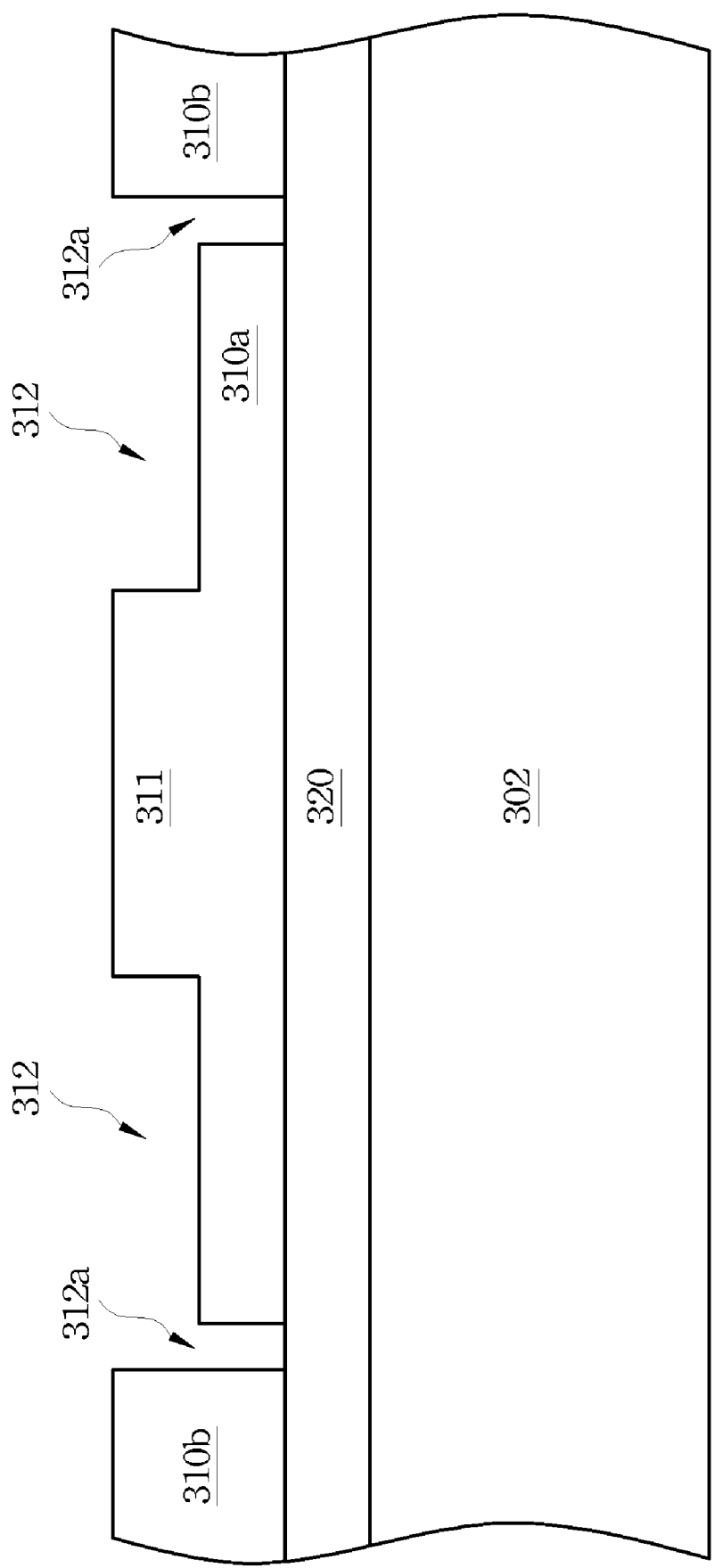

In FIG. 3C, additional portion of the material layer 310 can be removed to define at least one channel 312a between a gyro disk 310a and a frame 310b. Items of FIG. 3C that are the same items in FIG. 1A are indicated by the same reference numerals, increased by 200. In embodiments, the formation of the channel 312a may include patterning the material layer 310 by a photolithography process, etching the material layer 310 (for example, by using a dry etching, wet etching, and/or plasma etching process), and then removing photoresist. In other embodiments, the photolithographic process, etching process, and the removing process can be repeated or saved to obtain a desired structure. In embodiments, a plurality of holes (not shown) are formed within the gyro disk 110a. The holes are formed for providing paths for removing the dielectric 320.

Figure 3D:
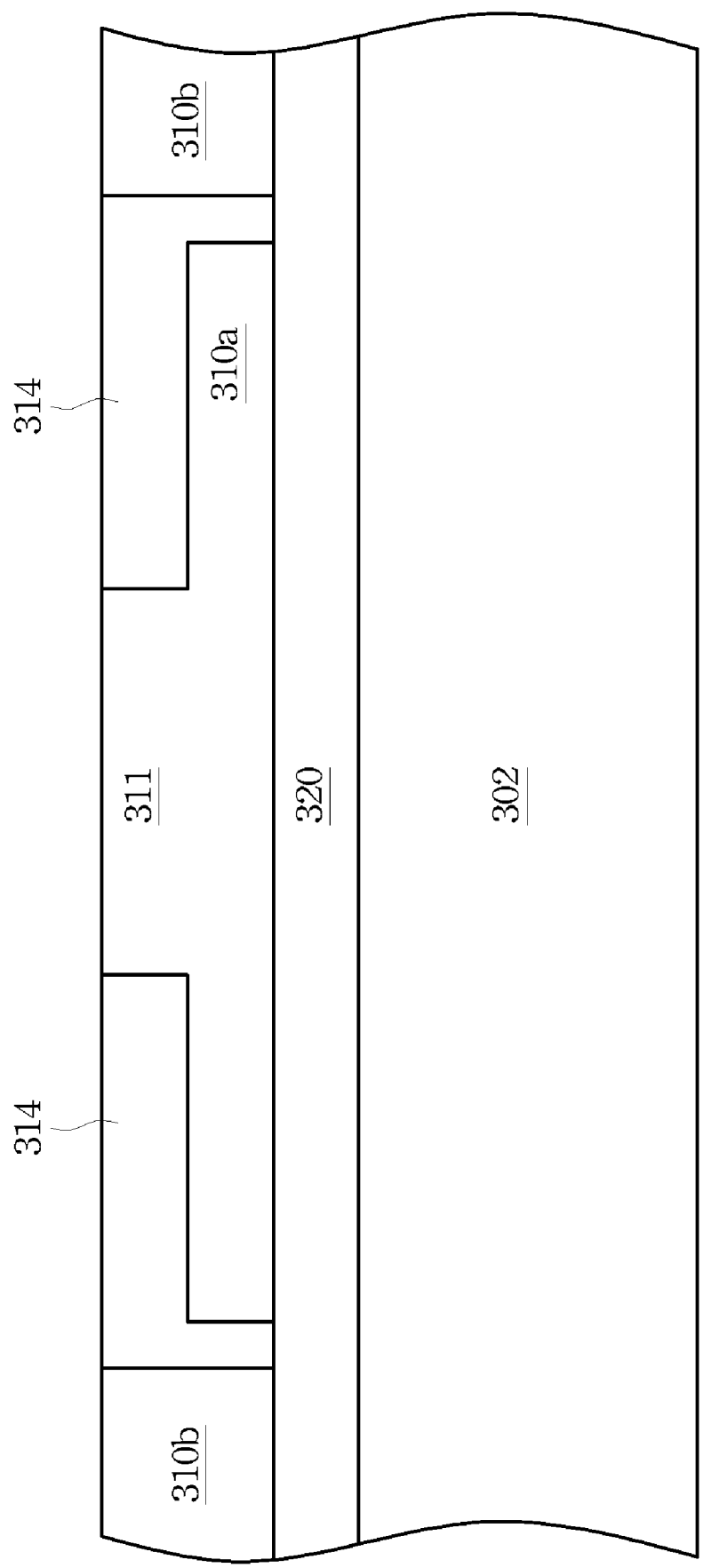

In FIG. 3D, a dielectric 314 can be formed within the recess 312 and the channel 312a (shown in FIG. 3C). The dielectric 314 can include at least one material such as oxide, nitride, oxynitride, other dielectric that has an etch selectivity different form that of the gyro disk 310a. In embodiments, the dielectric 314 can be formed by using a chemical vapor deposition process, a removing process such as chemical-mechanical polishing (CMP) and/or etching process, a cleaning process, and/or any combinations thereof. In embodiments, the gyro disk 310a and the dielectric 314 can have a substantially level surface.

Figure 3E:
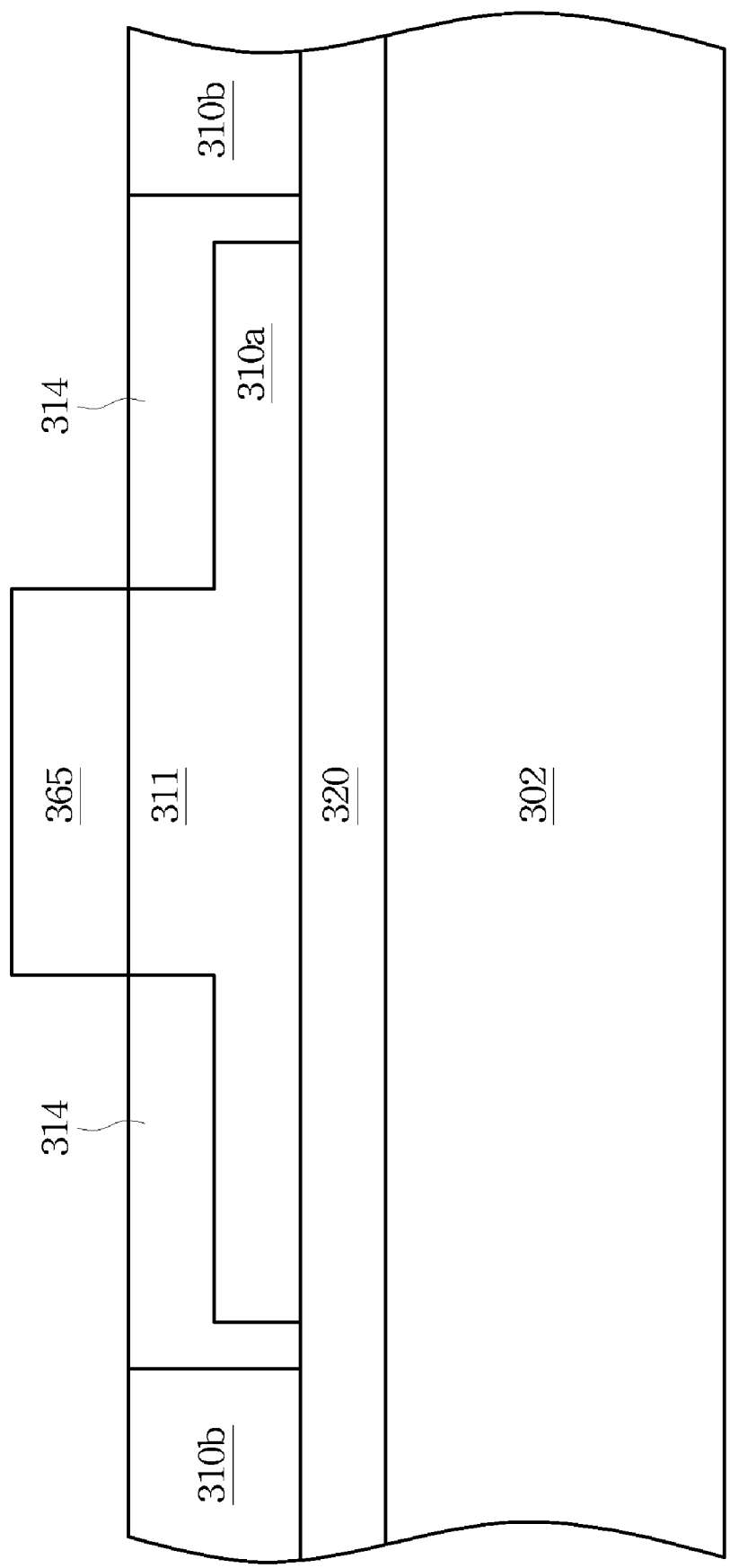

In FIG. 3E, electrodes 365 and 367 can be formed over the gyro disk 310a and the frame 310b, respectively. The electrodes 365 and 367 can be the same as the electrodes 165 and 167, respectively, described above in conjunction with FIG. 1A. In embodiments, the electrode 365 can have a width between about 1 µm and about 2 µm, such as about 2 µm. In embodiments, the formation of the electrodes 365 and 367 may include forming an electrode material layer (for example, by using a CVD process, patterning the electrode material layer by a photolithography process, etching the electrode material layer (for example, by using a dry etching, wet etching, and/or plasma etching process), and then removing photoresist. In other embodiments, the photolithographic process, etching process, and the removing process can be repeated or saved to obtain a desired structure.

Figure 3F:
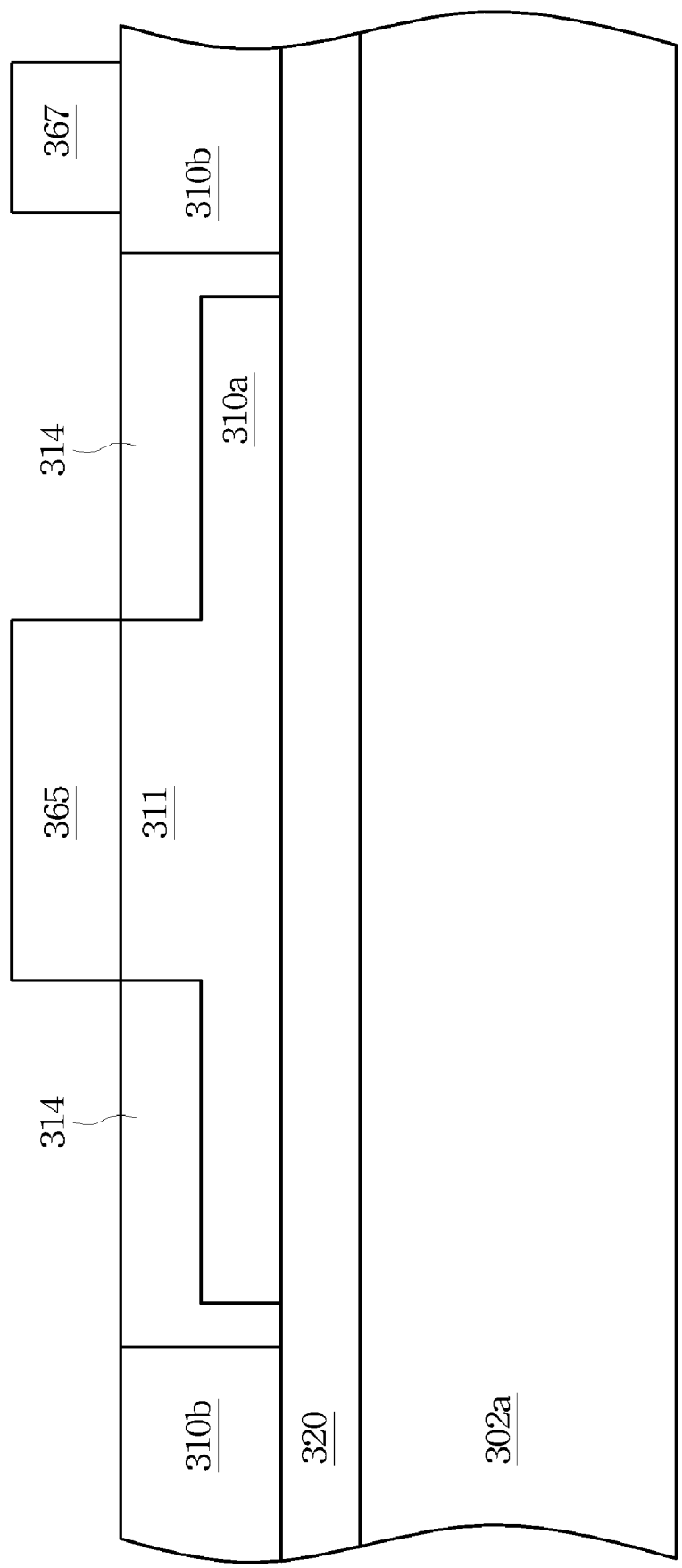

In FIG. 3F, the substrate 302 can be thinned to provide a thinned substrate 302a. The thinned substrate 302a can have a thin thickness such that channels can be desirably formed therein. The thinning process can include, for example, a backside grinding process, etching process, polishing process, and/or any combinations thereof. In embodiments, the thinning process can be saved if a desired channel can be formed within the substrate 302.

Figure 3G:
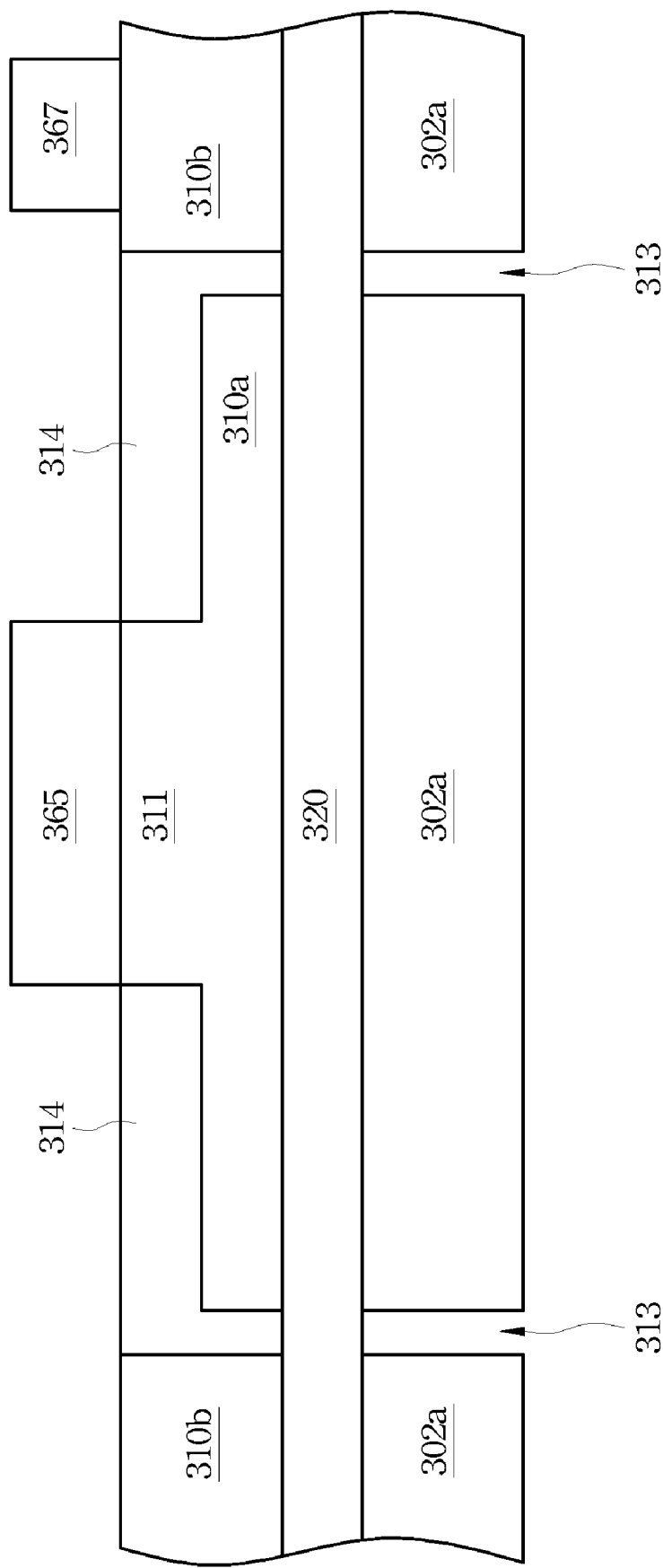

Referring to FIG. 3G, at least one channel such as channels 313 can be formed within the thinned substrate 302a, exposing the dielectric 320. In embodiments, the channels 313 can be corresponding to the channels 312a (shown in FIG. 3C). The channels 313 can have a width that is equal to about or more than a wavelength of a light beam that passes through the channels 313. In embodiments, the formation of the channel 313 may include patterning the thinned substrate 302a by a photolithography process, etching the thinned substrate 302a (for example, by using a dry etching, wet etching, and/or plasma etching process), and then removing photoresist. In other embodiments, the photolithographic process, etching process, and the removing process can be repeated or saved to obtain a desired structure.

Figure 3H:
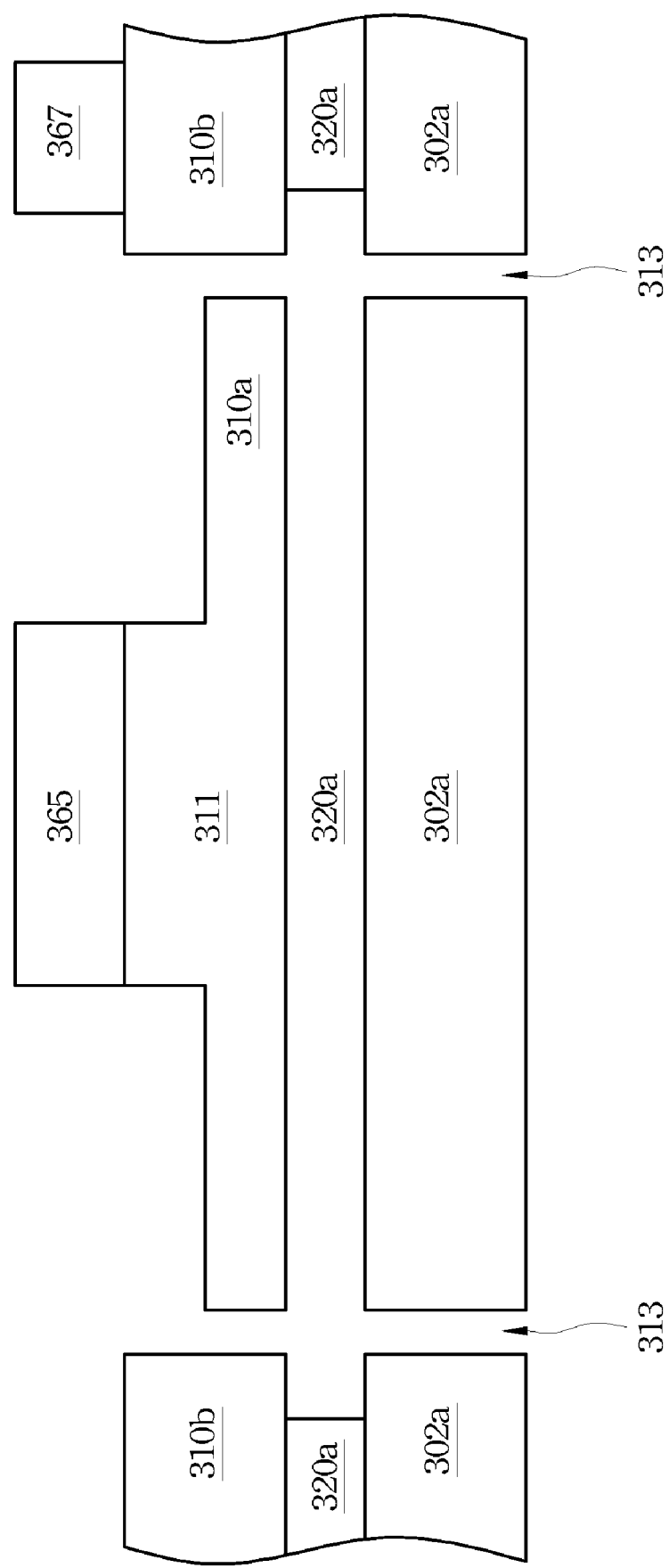

Referring to FIG. 3H, a portion of the dielectric 320 (shown in FIG. 3G) can be removed to form the dielectric 320a separating gyro disk 310a from the substrate 302a. Items of FIG. 3H that are the same items in FIG. 1A are indicated by the same reference numerals, increased by 200. The removal process can include, for example, a wet etching process having a desired etching selectivity for the dielectric 320 to the gyro disk 310a. The removal process can desirably remove the portion of the dielectric 320 and be free from etching the gyro disk 310a. In embodiments, the dielectric 320 can include silicon oxide and the removal process can use a solution including diluted hydrofluoric acid (HF).

After the formation of the structure shown in FIG. 3H, the structure can be assembled with at least one light source and at least one light receiver to form a desired gyroscope sensor as same as the gyroscope sensor 101 described in conjunction with FIG. 1A. The gyroscope sensor can be further assembled with power sources and at least one processing unit to form a system as same as the system 100 described above in conjunction with FIG. 1A.

It is noted that the structure (shown in FIG. 3H) for a gyroscope sensor formed by the process described above in conjunction with FIGS. 3A-3H can be assembled with the light sources 130, 140, and 150. Compared with a process forming different structures a conventional capacitive gyroscope for sensing Coriolis forces at a gyroscopic X-axis and a gyroscopic Y-axis, the process described above in conjunction with FIGS. 3A-3H can be desirably simplified. In embodiments, merely 6 layers of masks may be used to form the structure shown in FIG. 3H from the structure shown in FIG. 3A.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A gyroscope sensor comprising:
a gyro disk;
a first light source configured to provide a first light beam adjacent to a first edge of the gyro disk
a first light receiver configured to receive the first light beam for sensing a vibration at a first direction of the gyro disk;
a second light source configured to provide a second light beam adjacent to a second edge of the gyro disk, wherein the second light beam is substantially parallel with the first light beam; and
a second light receiver configured to receive the second light beam for sensing a vibration at a second direction of the gyro disk, wherein the second direction is substantially perpendicular to the first direction.

2. The gyroscope sensor of claim 1 further comprising:
a third light source configured to provide a third light beam adjacent to a surface of the gyro disk, wherein the third light beam is substantially perpendicular to the first light beam; and
a third light receiver configured to receive the third light beam for sensing a vibration at a third direction of the gyro disk, wherein the third direction is substantially perpendicular to the first direction.

3. The gyroscope sensor of claim 1 further comprising a frame disposed around the gyro disk, wherein a light channel is between the frame and the first edge of the gyro disk and the light channel has a width being equal to about or more than the wavelength of the first light beam.

4. The gyroscope sensor of claim 3, wherein the light channel continuously extends around the gyro disk.

5. The gyroscope sensor of claim 3, wherein the gyro disk comprises a plurality of channels and two of the channels have an angle of about 30° or about 45°.

6. The gyroscope sensor of claim 5, wherein the frame include a plurality of channels corresponding to the channels of the gyro disk.

7. A system comprising:
a gyroscope sensor comprising:
a gyro disk;
a first light source configured to provide a first light beam adjacent to a first edge of the gyro disk; and
a first light receiver configured to receive the first light beam for sensing a vibration at a first direction of the gyro disk;
a second light source configured to provide a second light beam adjacent to a second edge of the gyro disk, wherein the second light beam is substantially parallel with the first light beam; and
a second light receiver configured to receive the second light beam for sensing a vibration at a second direction of the gyro disk, wherein the second direction is substantially perpendicular to the first direction; and
a processing unit coupled with the gyroscope sensor, the processing unit being capable of controlling the system corresponding to the vibration at the first direction of the gyro disk.

8. The system of claim 7, wherein the gyroscope sensor further comprises:
a third light source configured to provide a third light beam adjacent to a surface of the gyro disk, wherein the third light beam is substantially perpendicular to the first light beam; and
a third light receiver configured to receive the third light beam for sensing a vibration at a third direction of the gyro disk, wherein the third direction is substantially perpendicular to the first direction.

9. The system of claim 7, wherein the gyroscope sensor further comprises a frame disposed around the gyro disk, wherein a light channel is between the frame and the first edge of the gyro disk and the light channel has a width being equal to about or more than the wavelength of the first light beam.

10. The system of claim 9, wherein the light channel continuously extends around the gyro disk.

11. The system of claim 9, wherein the gyro disk comprises a plurality of channels and two of the channels have an angle of about 30° or about 45°.

12. The system of claim 11, wherein the frame includes a plurality of channels corresponding to the channels of the gyro disk.

13. The system of claim 9 further comprising:
a direct current (DC) source coupled with the gyro disk; and
an alternating current (AC) source coupled with the frame, wherein the DC source and the AC source are configured to provide an oscillating vibration of the gyro disk.

14. The system of claim 9 further comprising a stator coupled with the gyro disk and the frame for providing an oscillating vibration.

15. A method for forming a structure for a gyroscope sensor, the method comprising:
forming a gyro disk spaced from a frame by at least one first light channel, wherein the first light channel is capable of providing a path for a first light beam that is capable of being sensed for determining a vibration at a first direction of the gyro disk; and
forming at least one second light channel within the frame, wherein the at least one second light channel is capable of providing a path for a second light beam which is capable of being sensed for determining a vibration at a second direction of the gyro disk, wherein the second direction is substantially perpendicular to the first direction.

16. The method of claim 15, wherein forming the gyro disk spaced from the frame comprises:
removing at least a portion of a dielectric between the gyro disk and a substrate through at least one channel within the substrate.

17. The method of claim 15, wherein the first light channel continuously extends around the gyro disk.

* * * * *